Oct. 14, 1941. H. J. OSTERHOF 2,259,352
PROCESS OF MAKING RUBBER HYDROCHLORIDE FILMS
Filed Dec. 23, 1938
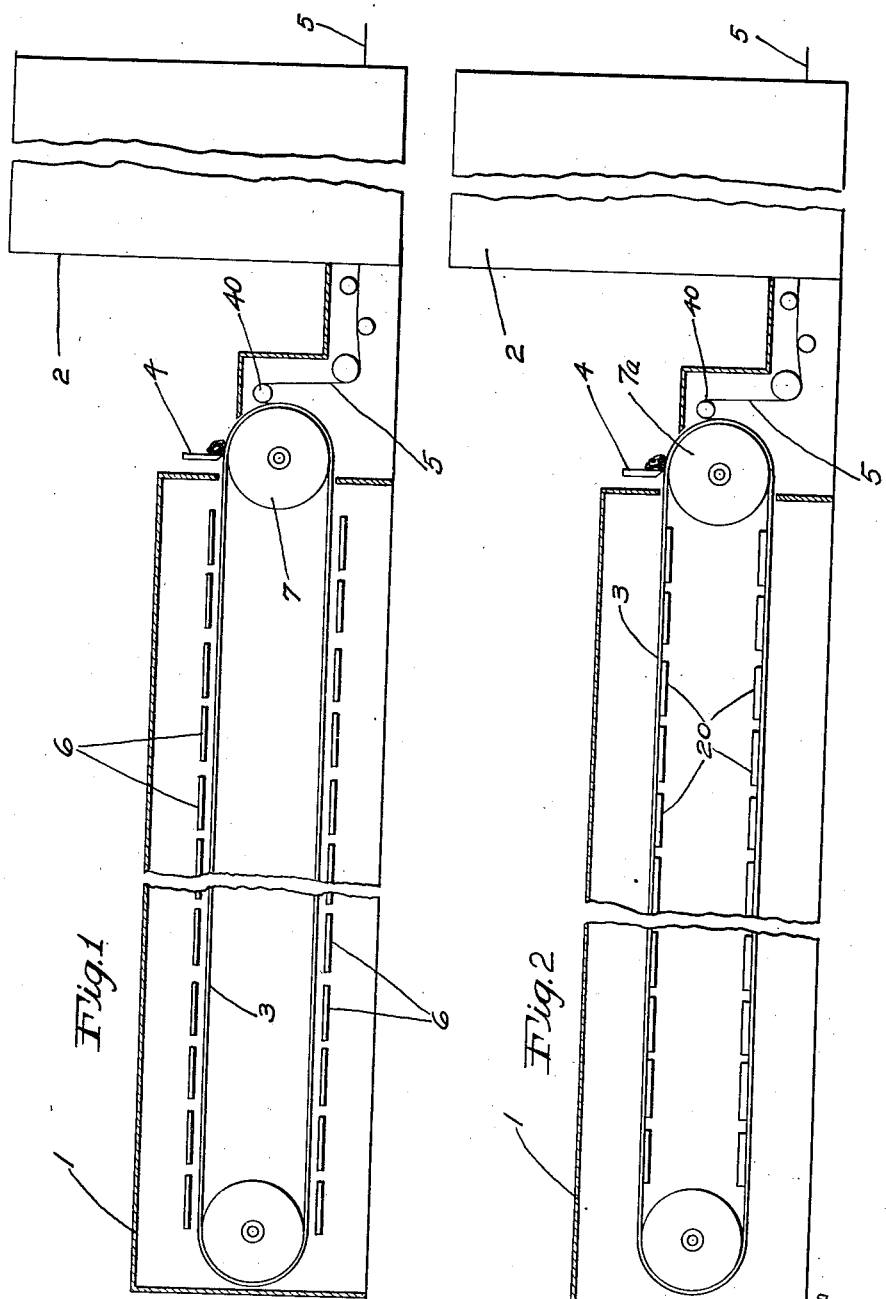
Inventor
Harold J. Osterhof
By
Attorney Patented Oct. 14, 1941

2,259,352

UNITED STATES PATENT OFFICE 2,259,352

PROCESS OF MAKING RUBBER HYDROCHLORIDE FILMS

Harold J. Osterhof, Cuyahoga Falls, Ohio, assignor to Wingfoot Corporation, Wilmington, Del., a corporation of Delaware Application December 23, 1938, Serial No. 247,356

10 Claims. (Cl. 18—57)

This invention relates to an improved method of making film from cements of rubber hydrochloride and like film-forming materials, including rubber hydrobromide, etc.

In preparing films of rubber hydrochloride by casting cements of rubber hydrochloride in low boiling solvents and evaporating the solvents it was observed that the films obtained were somewhat cloudy or opalescent. This cloudiness or opalescence was found to be due to minute irregularities in the exposed surface of the film, i. e., the surface contiguous to the air space into which the solvent vapors passed on evaporation.

Microscopic examination of the phenomena occurring during casting of film from a rubber hydrochloride cement showed that there was no vortex action because the cement viscosity was too high, but surface irregularities formed as a slowly advancing front of tiny depressions. After the depressions were once formed, new ones did not appear but those present increased in area and depth. Both of the observed phenomena were due to the evaporation of solvent, with formation of a gel due to exceeding the solubility of the rubber-HCl. The shrinkage stresses were due to loss of solvent. The gel structure resisted the shrinkage but gave way at points of weakness, the uneven surface thus formed causing the surface opalescence. In order to resolve the surface inequalities and measure them, cross-sections were cut with a razor blade and observed with the microscope. The worst film examined had elevations 4 microns apart, the valleys averaged 1.5 microns deep, and the greatest difference between elevation and valley was 4.8 microns. Brilliant appearing films, as prepared according to the methods of this disclosure were much more plane, elevations being 6 microns apart, the valleys 0.5 micron and less, and greatest difference between elevation and valley being 0.9 micron.

Due to these surface irregularities the film lacked the clarity and brilliance desired in a transparent pellicle designed for packaging and the manufacture of rain-coats, etc. These surface irregularities were found in film cast from different solvents, viz, films cast from chloroform cements of rubber hydrochloride and films cast from benzene cements of rubber hydrochloride. These two solvents are typical of solvents which have a different action on rubber hydrochloride. Chloroform cements do not gel on cooling. Other solvents which like chloroform produce cements which do not gel include methylene dichloride, symmetrical dichloroethylene, tri chlor ethane, tetrachlorethane, etc. Benzene cements gel on cooling. So do cements made with toluene, xylene, trichlor ethylene, ethylene dichloride, i. e. 1,2-dichlorethane, propylene dichloride, chlorobenzene, etc.

No difficulty was experienced in producing clear films from non-gelling cements containing higher boiling solvents, such as tetrachlorethane, etc. Although such films are clear, the heat and time required for the evaporation of such higher boiling solvents makes their use undesirable for commercial film production. The low boiling solvents, i. e. solvents boiling under about 115° C., all gave cloudy films regardless of whether gelling or non-gelling cements were employed. The difference in the clarity of films produced from non-gelling cements containing higher boiling solvents as compared with those produced from either non-gelling or gelling cements containing the lower boiling solvents has been found to be due to the fact that the low boiling solvents evaporate so rapidly that under the usual operating conditions their surface becomes so cool because of the heat absorbed on evaporation of the solvent that it solidifies prematurely, due either to gelation or skinning, i. e. before sufficient solvent has evaporated from the body of the film under the surface to give ultimately uniform solidification of the entire film mass without contraction or other distortion of the surface.

According to this invention premature solidification of the rubber hydrochloride at the surface of film produced from cements containing low boiling solvents is prevented whether the solidification be due to the gelling of cements, such as benzene cements, or the skinning over of other cements, such as chloroform cements. This is done by maintaining the exposed surface of the film above the temperature at which solidification (either gelling or skinning over) takes place during the initial stage of evaporation of solvent. Raising the temperature of the surface accelerates the votalization of solvent, which is desirable as it reduces the time required for preparation of the ultimate film.

The evaporation of solvent may advantageously take place in two stages,—a first stage in which the cement is supported by some suitable surface such as a belt, and a second stage after sufficient solvent has been evaporated to form a film which will support its own weight. In this second stage the film is removed from the support which carries it through the first stage and both surfaces of the film are exposed so that solvent is simultaneously evaporated from both surfaces. In this second stage the film may be festooned in a chamber through which hot gases are circulated. The rapid evaporation of solvent from a freshly cast cement of rubber hydrochloride in benzene or chloroform or other low-boiling solvent, in the initial portion of the first stage of such a two-stage drying process, will cool the surface of the cement film to the temperature at which solidification occurs unless the surface of the film is heated to a temperature sufficient to prevent such solidification. Any suitable means for maintaining the required temperature may be employed.

Regardless of the source of heat, it is desirable to circulate air or other gas through the drying chamber to remove the vapors as they evaporate from the film. The temperature of the air entering the chamber may be the same as that of the air and vapors leaving the chamber, in which case all the heat will be supplied from some other source. Or the air may enter the chamber at a higher temperature than that at which the gases and vapors leave. The heat in the air may supplement heat supplied from some other source.

Radiant heat may be satisfactorily employed to supply all or part of the heat required in the first drying chamber. Electrically or steam heated plates may be used for this purpose and the individual units may be heated to different temperatures so as to vary the temperature to which the film is subjected as the evaporation of solvent progresses. The unit or units located above the freshly cast cement must be maintained at a higher surface temperature in order to furnish heat sufficient to prevent premature solidification.

The use of radiant heat differs from the use of heated gas to evaporate solvent because in the latter case there is a thin film of gas adjacent the surface of the film of cement which is more or less stagnant and the transfer of heat from the gas to the film is hindered by this layer of gas. When heating by radiant heat the heat passes through the overlying gas and through the surface of the film and heats the body of the film of cement directly.

The film may be cast on a metal belt or cylindrical shell, and all or part of the heat required for evaporation of the solvent may be conveyed to the cement film from the metal belt. The heat may be supplied to the belt by any suitable means. Electric, steam, or hot water heaters, located adjacent the surface of the belt opposite that on which the film is carried may be used for this purpose or the metal belt may be heated by electric induction methods. The belt may be heated from these heaters by radiant heat or by direct contact. The heaters may extend the whole length of the belt or they may be located at intervals. It is preferable to supply the heat to the metal belt from different units, heated to different temperatures, so that the temperature of the belt at various stages of the drying operation can be carefully controlled. The temperature of heaters located under that portion of the belt which supports the freshly cast cement, or adjacent that portion of the belt which is moving into position to receive the freshly cast cement, will be so adjusted that the surface of the freshly cast film will not solidify prematurely.

Regardless of the means employed for supplying the heat, the temperature at the surface of the film of the freshly cast cement will be sufficiently high to prevent premature solidification of the rubber hydrochloride. After a considerable percent of solvent has been removed the entire body of the film, including the exposed surface, will gel or otherwise solidify. If the surface has been allowed to solidify prematurely irregularities will form in the exposed surface as the balance of the solvent is removed from the cement. If the exposed surface is maintained at a sufficiently high temperature so that there is no premature solidification the removal of the balance of the solvent will be effected without any distortion of the surface of the film and a film having a perfectly smooth surface will be formed. This film will be clear and brilliant.

The invention will be described in connection with the accompanying schematic drawing in which:

Fig. 1 is an elevation (partly in section) of equipment using radiant heat, and

Fig. 2 is an elevation (partly in section) of equipment with means for heating the belt.

In both cases equipment is provided for carrying out the drying in two stages. The equipment is the same in both cases except that in Fig. 1 radiant heat is used whereas in Fig. 2 the belt is heated.

In the first drying chamber 1 sufficient solvent is evaporated to produce a film 5 which will support its own weight. The film is then further dried in the second drying chamber 2 where it is festooned in any suitable manner. Heated air is supplied to both chambers, and air and vapors are removed from both chambers to a condenser where the solvent is recovered. Means for supplying the gas and removing it through a condenser is well known in the art and is therefore not shown.

In the first drying chamber 1 is a belt 3 which is 150 feet long. In Fig. 2 a metal belt is used. The belt in Fig. 1 may be a canvas belt coated with a cellulosic coating which is not attacked by the solvent employed. Any suitable casting surface may be used.

Various means for casting the film on the belt are known in the art. The rubber hydrochloride may be supplied to the casting surface through any such means symbolized by the spreading knife 4.

The temperature required to prevent premature solidification of the exposed surface of the film will depend upon the solvent used, the solids content of the cement, etc. The exact temperature at the surface of the cement cannot be accurately measured. This is best described by referring to the temperature of the cement under the surface which was measured by a thermocouple. The following data is illustrative of the results obtained with radiant heat. Using a benzene cement of rubber hydrochloride (about 30% chlorine content), operating the belt at about 65–70 feet per minute, if the cement under the film surface is kept around 130° F. in traveling the first thirty inches from the knife there will not be sufficient solidification at the surface to appreciably affect the clarity of the film produced.

In the accompanying table are presented the temperatures as measured by a thermocouple imbedded in the drying cement. The air temperature was held at 135° F. in all cases, while the temperature of the radiator was varied. The time shows the number of seconds elapsed after the cement film passed under the first radiator.

| Time in seconds | No radiator | 300° F. radiator | 400° F. radiator | 500° F. radiator |
|---|---|---|---|---|
| | ° F. | ° F. | ° F. | ° F. |
| 0 | 100 | 100 | 100 | 100 |
| 10 | 85 | 103 | 108 | 120 |
| 20 | 87 | 103 | 113 | 134 |
| 30 | 87 | 104 | 116 | 151 |
| 40 | 86 | 105 | 121 | 168 |
| 50 | 86 | 106 | 124 | 185 |
| 60 | 88 | 108 | 129 | 197 |
| 90 | 91 | 115 | 143 | |

With no radiator the film could be stripped off in 150 seconds and was cloudy, with the 500° F. radiator the film could be stripped in 30–40 seconds and was quite brilliant.

Solidification should preferably commence about ten feet from the knife 4 and at this point the temperature of the cement under the surface of the film may preferably be about 120° F. According to a preferred procedure the evaporation of solvent is so controlled that the film leaving the first drying chamber contains no more than about 2 to 6% of benzene. The film is then removed from the belt and the balance of the solvent evaporated in the second drying chamber.

With the heated metal belt or cylindrical shell, in the case of benzene cements, it was found advantageous to spread the warm cement on the metal surface heated initially to not over 120° F. The belt temperature was then increased to operating temperature as rapidly as possible. For best clarity of film the belt temperature was preferably held in the range of 160 to 175° F., while the temperature of the air stream was relatively unimportant, anywhere in the range of 90° to 170° F. being satisfactory. The most satisfactory condition for continuous operation with benzene cements containing from 6% to 10% rubber hydrochloride was a metal belt temperature of 160° to 165° F., and an airstream temperature of 140° F.

The temperatures given are as accurate as the measuring means permitted. The above temperatures at least approximate those to be maintained whether radiant heat alone is employed or whether all of the heat is supplied through the belt. The minimum permissible temperature may vary somewhat depending upon the concentration of the cement, degree of reaction of the rubber hydrochloride, the temperature of the inlet and exit gas and vapors, the solvent employed, etc. The proper temperature for any particular set of conditions is readily obtainable by experimentation, once it is appreciated that clear film may be produced if premature solidification of the exposed surface is prevented.

In Fig. 1, electrically heated units, 6, are shown for supplying the required heat by radiation. Units with a blackened surface are suitable for the purpose. They are preferably located as close to the surface of the film as possible, in order to take advantage of heat conduction as well as radiation. The units nearest the knife 4, which are the units above the freshly cast film are hotter than the rest of the units. The temperature to which the surface of these units is to be heated will depend upon their area, their distance from the film, etc.

In Fig. 2, the units for heating the belt are indicated by the numeral 20. According to the arrangement shown the belt is heated by contact with the units 20. The belt may be further heated by radiation from heated units similar to units 6 in Fig. 1. The temperature to which the belt must be heated depends upon the composition of the belt and other factors affecting the rate of heat transfer from the belt to the cement.

In apparatus of both Figs. 1 and 2 the cylindrical shell or pulley 7, 7a which is nearest to the spreading blade is internally cooled with cold water so as to cool down the belt in order (1) to prevent bubble formation which results when cement is spread upon too hot a belt surface, and (2) to cool and set the film before the strip-off to prevent the distortion of the film which would occur if it were stripped when too hot. A stream of cold air impinging upon the film for a few feet before the strip-off may be desirable to aid in cooling down the film.

The design of the drying chamber may, of course, be varied. A longer or shorter belt may be used. The concentration of the rubber hydrochloride in the cement may be varied. Various solvents may be employed. Films of different thickness, such as films .0075 to .002 inch thick may be formed. The rubber hydrochloride is preferably made as disclosed in Calvert 1,989,632. Dyestuffs, etc. may be added as desired.

Although the invention has been more particularly described in connection with the production of film from a benzene cement it is not limited thereto but applies to the removal of other low boiling and fast volatilizing solvents. Both non-gelling and gelling solvents which do not boil appreciably above 115° C. may be used in the cements from which films are made according to this invention.

I claim:

1. That step in the method of producing clear rubber hydrochloride film by evaporation of low boiling solvent from film of a rubber hydrochloride cement which comprises supplying sufficient heat to the exposed surface of a freshly cast film of the cement during the rapid evaporation of solvent therefrom and while the film of cement is supported on a film-forming surface, to prevent premature solidification of rubber hydrochloride in the exposed surface of the film which solidification early in the evaporation of solvent therefrom would result in the formation of irregularities in said surface on completion of the evaporation of solvent from the film.

2. That step in the production of clear rubber hydrochloride film from a cement of rubber hydrochloride in a low boiling solvent which on concentration and cooling causes gelation of the rubber hydrochloride, which step comprises supplying sufficient heat to the exposed surface of a freshly cast film of the cement during the rapid evaporation of solvent therefrom and while the film is supported on a film-forming surface to prevent premature gelation of the rubber hydrochloride at the exposed surface which premature gelation would cause irregularities to form in the surface of the film on evaporation of the cement to dryness.

3. That step in the formation of clear rubber hydrochloride film from a gel-forming cement of a rubber hydrochloride in a low boiling solvent, which step comprises supplying to a freshly cast film of the cement during the rapid evaporation of solvent therefrom and while the cement is supported on a film-forming surface, heat in an amount sufficient to prevent premature gelation of rubber hydrochloride at or near the surface of the film from which the solvent is being evaporated, which premature gelation would result in the formation of minute irregularities in said surface on subsequent evaporation to dryness.

4. The method of forming a clear rubber hydrochloride film which comprises casting on a surface a cement of a rubber hydrochloride in a low boiling solvent and thereafter evaporating the solvent to produce a rubber hydrochloride film, and conducting the first stage of the evaporation in an enclosure containing a source of radiant energy so located as to radiate heat onto the freshly cast film of cement during the rapid evaporation of solvent therefrom and supplying radiant heat to the freshly cast film from said source in sufficient amount to maintain the exposed surface of the film at such a high temperature as to prevent premature solidification of rubber hydrochloride at said surface, which premature solidification would cause irregularities to be formed in the surface of the film on removal of the balance of the solvent therefrom.

5. The method of forming clear rubber hydrochloride film which comprises casting on a metal surface a cement of a rubber hydrochloride in a low boiling solvent and thereafter evaporating the solvent to produce a film of the rubber hydrochloride, and supplying heat to said metal surface in such a manner and in an amount sufficient to maintain the exposed surface of the freshly cast film at a sufficiently high temperature during the rapid evaporation of solvent therefrom to prevent premature solidification of the rubber hydrochloride therein, which premature solidification would cause irregularities to be formed in the surface of the film on removal of the balance of the solvent therefrom.

6. The method of producing clear rubber hydrochloride film from a cement of rubber hydrochloride in a low boiling solvent, which comprises supplying sufficient heat to the surface of the freshly cast film of cement during the rapid evaporation of solvent therefrom to prevent premature solidification of the rubber hydrochloride at said surface.

7. The method of producing clear rubber hydrochloride film from a benzene cement of a rubber hydrochloride containing about seven and one-half per cent of rubber hydrochloride which comprises casting a film of said cement on a film-forming surface and during the rapid evaporation of solvent from the freshly cast film, supplying sufficient heat to the exposed surface of the cement film to prevent premature solidification of rubber hydrochloride therein.

8. The method of producing film from a cement of rubber hydrochloride in a low boiling solvent, which comprises casting the cement on a surface, and supplying more heat to the cast film in the initial stage of drying than after appreciable solvent has been evaporated, thereby during rapid evaporation of solvent in said initial stage maintaining the exposed surface of the film at such a temperature as to prevent premature solidification of rubber hydrochloride therein, which premature solidification would result in the production of cloudy film on completion of the evaporation of the solvent.

9. The method of forming clear rubber hydrochloride film which comprises casting on a metal surface a cement of a rubber hydrochloride in a low boiling solvent, thereafter evaporating the solvent to produce a film of rubber hydrochloride, supplying sufficient heat to the exposed surface of the freshly cast film to prevent premature solidification of the rubber hydrochloride at the surface of the film, which premature solidification would cause irregularities to be formed in the surface of the film on removal of the balance of the solvent therefrom, and supplying heat for evaporation of solvent to the cement from the metal belt.

10. The method of casting film from a rubber hydrochloride cement on a continuous casting surface, which comprises supplying sufficient heat to the freshly cast film to maintain its exposed surface at a sufficiently high temperature to prevent premature solidification of the rubber hydrochloride at its surface, which premature solidification would cause irregularities to be formed in the surface of the film on removal of the balance of the solvent therefrom, and cooling the casting surface just prior to the removal of the film therefrom in order (1) to cause the film to set and thus prevent distortion of the film which would occur if the film were stripped from the surface while still hot and (2) to prevent bubble formation in cement cast on the surface from which the film is removed, which bubble formation would occur if the cement were cast on too hot a surface.

H. J. OSTERHOF